US010737686B2

(12) United States Patent
Kinoshita

(10) Patent No.: US 10,737,686 B2
(45) Date of Patent: Aug. 11, 2020

(54) VEHICLE CONTROL APPARATUS

(71) Applicant: SUBARU CORPORATION, Tokyo (JP)

(72) Inventor: Takahiro Kinoshita, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 367 days.

(21) Appl. No.: 15/839,649

(22) Filed: Dec. 12, 2017

(65) Prior Publication Data

US 2018/0229715 A1 Aug. 16, 2018

(30) Foreign Application Priority Data

Feb. 15, 2017 (JP) .................................. 2017-025551

(51) Int. Cl.
*B60W 20/15* (2016.01)
*B60W 30/18* (2012.01)
(Continued)

(52) U.S. Cl.
CPC ............. *B60W 20/15* (2016.01); *B60K 6/485* (2013.01); *B60W 10/06* (2013.01); *B60W 10/08* (2013.01);
(Continued)

(58) Field of Classification Search
CPC ...... B60W 20/11; B60W 20/13; B60W 20/15; B60W 10/06; B60W 10/08; B60W 30/18018; B60K 6/485
(Continued)

(56) References Cited

U.S. PATENT DOCUMENTS

| 2007/0145924 A1 | 6/2007 | Obayashi | |
| 2014/0229048 A1* | 8/2014 | Kawata | B60K 6/48 701/22 |

(Continued)

FOREIGN PATENT DOCUMENTS

| JP | 2007-176270 | 7/2007 |
| JP | 2013-252765 A | 12/2013 |
| JP | 2016-182895 | 10/2016 |

OTHER PUBLICATIONS

Japanese Office Action dated Jun. 19, 2018 in corresponding Japanese Application No. 2017-025551 with an English translation thereof.

Primary Examiner — Thomas G Black
Assistant Examiner — Luat T Huynh
(74) Attorney, Agent, or Firm — McGinn IP Law Group, PLLC

(57) ABSTRACT

A vehicle control apparatus causes a vehicle to selectively perform an engine mode and an assist mode that allow for transfer of, respectively, drive force of an engine and both drive forces of the engine and an electric motor to a wheel. The vehicle control apparatus includes: a consumption amount calculator that calculates first and second fuel consumption amounts, respectively, when performing the engine and assist modes; a reduction amount calculator that calculates a possible fuel reduction amount by subtracting the second fuel consumption amount from the first fuel consumption amount; a mode controller that causes the assist and engine modes to be performed, respectively, when the fuel reduction amount exceeds and is equal to or below a threshold; and a threshold setter that sets the threshold to first and second values, respectively, when a state of charge of an electricity storage device is in first and second charging levels.

4 Claims, 11 Drawing Sheets

(51) Int. Cl.
  *B60W 20/13* (2016.01)
  *B60W 10/08* (2006.01)
  *B60W 10/06* (2006.01)
  *B60W 20/11* (2016.01)
  *B60K 6/485* (2007.10)

(52) U.S. Cl.
  CPC ............ *B60W 20/11* (2016.01); *B60W 20/13* (2016.01); *B60W 30/18018* (2013.01); *B60W 2510/244* (2013.01); *Y02T 10/6226* (2013.01); *Y02T 10/6286* (2013.01)

(58) Field of Classification Search
  USPC .......................................................... 701/22
  See application file for complete search history.

(56) References Cited

U.S. PATENT DOCUMENTS

| | | | |
|---|---|---|---|
| 2015/0051775 A1* | 2/2015 | Gotoh ................... | B60W 10/26 701/22 |
| 2015/0051776 A1* | 2/2015 | Gotoh ................... | B60W 20/15 701/22 |
| 2016/0193992 A1* | 7/2016 | Hancock ................ | B60K 6/48 701/22 |

* cited by examiner

VEHICLE CONTROL APPARATUS

CROSS-REFERENCE TO RELATED APPLICATIONS

The present application claims priority from Japanese Patent Application No. 2017-025551 filed on Feb. 15, 2017, the entire contents of which are hereby incorporated by reference.

BACKGROUND

The technology relates to a vehicle control apparatus of a vehicle provided with a selectable assist mode that allows for transfer of drive force of each of an engine and an electric motor to a wheel.

A vehicle such as an automobile is often mounted not only with an engine as a power source, but also with an electric motor such as a motor generator and an integrated starter generator (ISG) as the power source. For example, reference is made to Japanese Unexamined Patent Application Publication No. 2013-252765. Assisting the engine using the electric motor enables an engine load to be reduced, thus allowing for reduction in a fuel consumption amount.

SUMMARY

Due to supply of electric power to an electric motor from an electricity storage device such as a battery, it has been difficult to assist an engine by the electric motor in a case of lowered state of charge SOC of the battery, even under a traveling situation where a high fuel-reducing effect is obtainable. What is therefore desired is to assist an engine by an electric motor while avoiding excessive lowering of a state of charge.

It is desirable to provide a vehicle control apparatus that is able to assist an engine by an electric motor while avoiding excessive lowering of a state of charge.

An aspect of the technology provides a vehicle control apparatus configured to cause a vehicle to selectively perform an engine mode and an assist mode. The vehicle is provided with an engine, an electric motor, a wheel, and an electricity storage device. The wheel is provided to receive drive force of the engine and drive force of the electric motor. The electricity storage device is coupled to the electric motor. The engine mode allows for transfer of the drive force of the engine to the wheel. The assist mode allows for transfer of both of the drive force of the engine and the drive force of the electric motor to the wheel. The vehicle control apparatus includes a consumption amount calculator, a reduction amount calculator, a mode controller, and a threshold setter. The consumption amount calculator is configured to calculate a first fuel consumption amount and a second fuel consumption amount. The first fuel consumption amount is an amount of fuel consumption when the engine mode is performed. The second fuel consumption amount is an amount of fuel consumption when the assist mode is performed. The reduction amount calculator is configured to calculate a possible fuel reduction amount by subtracting the second fuel consumption amount from the first fuel consumption amount. The possible fuel reduction amount is an amount of fuel reduction being possibly reduced in a case where the assist mode is performed as compared with a case where the engine mode is performed. The mode controller is configured to cause the assist mode to be performed when the fuel reduction amount exceeds a threshold, and cause the engine mode to be performed when the fuel reduction amount is equal to or falls below the threshold. The threshold setter is configured to set the threshold to a first value when a state of charge of the electricity storage device is in a first charging level, and set the threshold to a second value when the state of charge of the electricity storage device is in a second charging level. The second value is higher than the first value. The second charging level is lower than the first charging level.

An aspect of the technology provides a vehicle control apparatus is configured to cause a vehicle to selectively perform an engine mode and an assist mode. The vehicle is provided with an engine, an electric motor, a wheel, and an electricity storage device. The wheel is provided to receive drive force of the engine and drive force of the electric motor. The electricity storage device is coupled to the electric motor. The engine mode allows for transfer of the drive force of the engine to the wheel. The assist mode allows for transfer of both of the drive force of the engine and the drive force of the electric motor to the wheel. The vehicle control apparatus includes circuitry. The circuitry is configured to: calculate a first fuel consumption amount and a second fuel consumption amount, in which the first fuel consumption amount is an amount of fuel consumption when the engine mode is performed, and the second fuel consumption amount is an amount of fuel consumption when the assist mode is performed; calculate a possible fuel reduction amount by subtracting the second fuel consumption amount from the first fuel consumption amount, in which the possible fuel reduction amount is an amount of fuel reduction being possibly reduced in a case where the assist mode is performed as compared with a case where the engine mode is performed; cause the assist mode to be performed when the fuel reduction amount exceeds a threshold; cause the engine mode to be performed when the fuel reduction amount is equal to or falls below the threshold; set the threshold to a first value when a state of charge of the electricity storage device is in a first charging level; and set the threshold to a second value when the state of charge of the electricity storage device is in a second charging level, in which the second value is higher than the first value, and the second charging level is lower than the first charging level.

DETAILED DESCRIPTION

Figure 1:
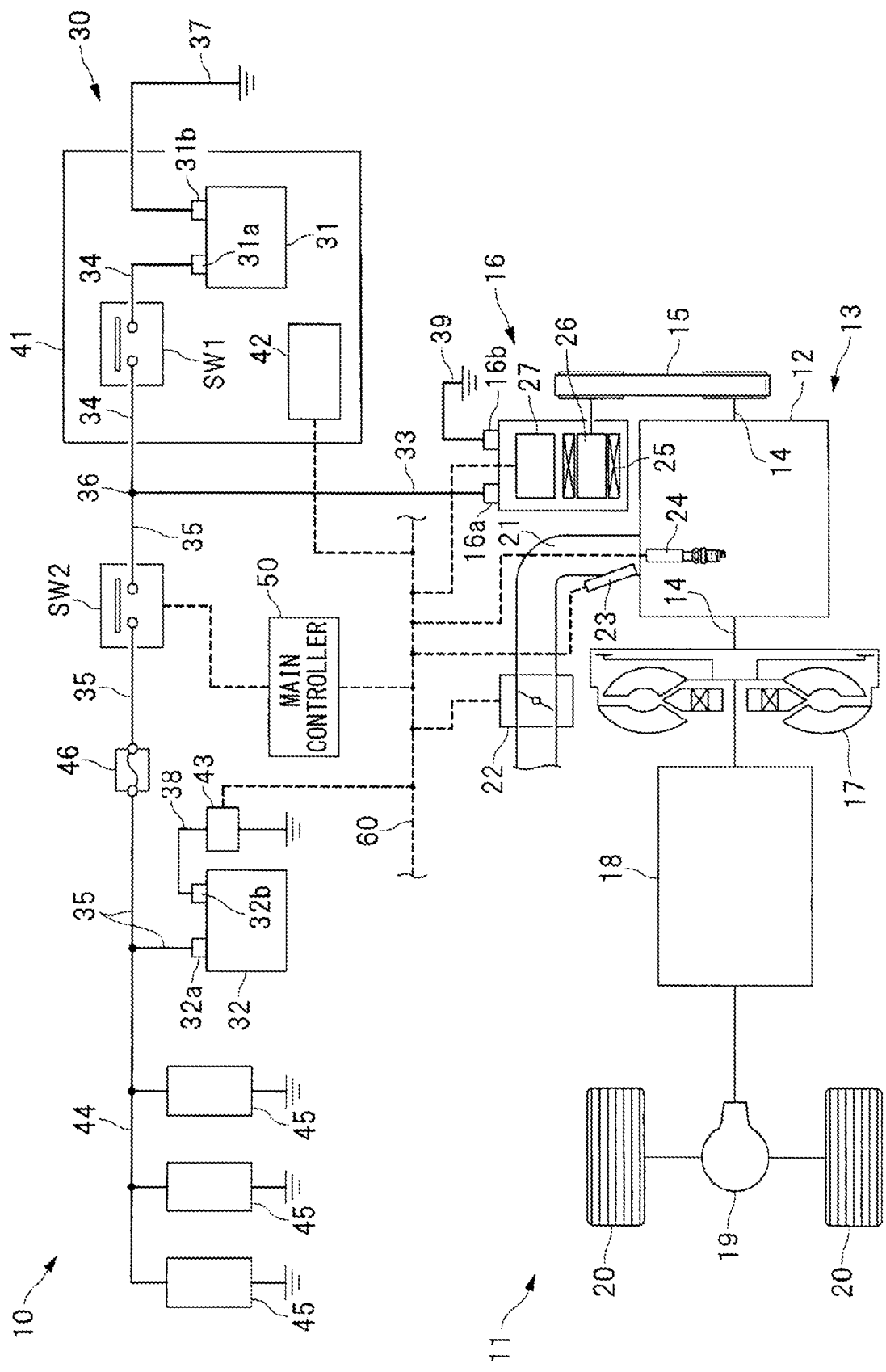
FIG. 1 schematically illustrates a vehicle provided with a vehicle control apparatus according to one implementation of the technology.

Description is given below in detail, with reference to the accompanying drawings, of some implementations of the technology. FIG. 1 schematically illustrates a vehicle 11 provided with a vehicle control apparatus 10 according to one implementation of the technology. As illustrated in FIG. 1, the vehicle 11 may be mounted with a power unit 13 that includes an engine 12. The engine 12 may include a crankshaft 14. A motor generator 16 may be coupled to the crankshaft 14 via a belt mechanism 15. In one implementation, the motor generator 16 may serve as an "electric motor". A transmission mechanism 18 may be coupled to the engine 12 via a torque converter 17. Wheels 20 may be each coupled to the transmission mechanism 18 via a member such as a differential mechanism 19. The engine 12 may include an intake manifold 21. A throttle valve 22 may be coupled to the intake manifold 21. The throttle valve 22 may adjust an air intake amount. The intake manifold 21 may include an injector 23 that injects fuel. The engine 12 may further include an ignition 24. The ignition 24 may include an ignitor and an ignition coil.

The motor generator 16 to be coupled to the engine 12 may be a so-called integrated starter generator (ISG). The ISG may serve both as an electric generator and the electric motor. The motor generator 16 may serve as the electric generator to be driven by the crankshaft 14. The motor generator 16 may also serve as the electric motor that starts and revolves the crankshaft 14 in a situation such as an idling stop control. Moreover, the motor generator 16 may also serve as the electric motor that assists the revolution of the crankshaft 14 in a situation such as start and acceleration. The motor generator 16 may include a stator 25 provided with a stator coil and a rotor 26 provided with a field coil. The motor generator 16 may further include an ISG controller 27 in order to control an electrically conductive state of each of the stator coil and the field coil. The ISG controller 27 may include components such as an inverter, a regulator, and a microcomputer. The ISG controller 27 may control the electrically conductive state of each of the field coil and the stator coil, thus controlling a factor such as torque of the motor generator 16.

[Power Supply Circuit]

Figure 2:
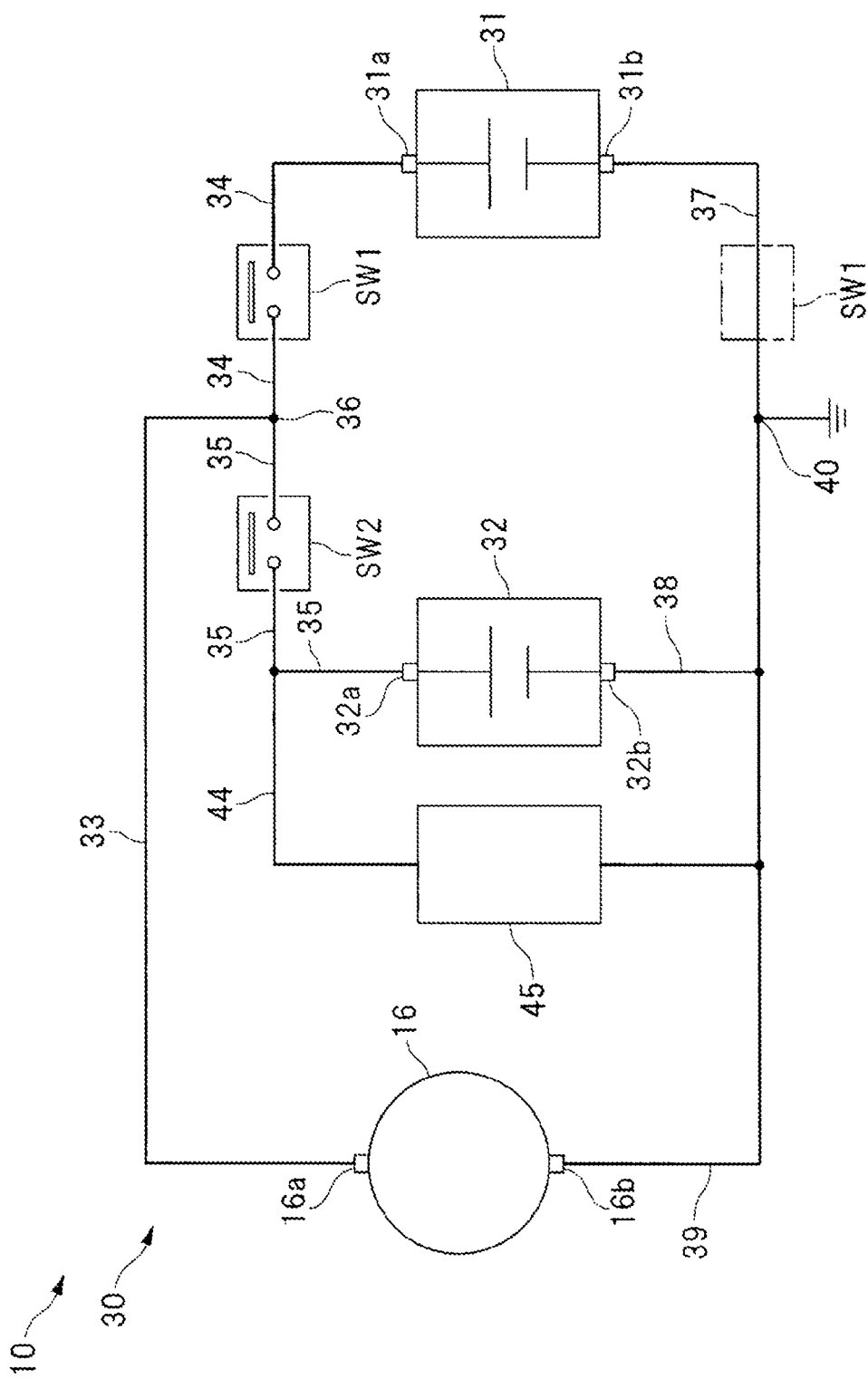
FIG. 2 is a circuit diagram illustrating an example of a power supply circuit.

Description is given of a power supply circuit 30 included in the vehicle control apparatus 10. FIG. 2 is a circuit diagram illustrating an example of the power supply circuit 30. As illustrated in FIG. 2, the power supply circuit 30 may include a lithium-ion battery 31 and a lead battery 32. In one implementation, the lithium-ion battery 31 may serve as an "electricity storage device". The lithium-ion battery 31 may be configured to be electrically coupled to the motor generator 16. The lead battery 32 may be configured to be electrically coupled to the motor generator 16 in parallel with the lithium-ion battery 31. Note that a terminal voltage of the lithium-ion battery 31 may be designed higher than a terminal voltage of the lead battery 32 in order to actively discharge the lithium-ion battery 31. Further, internal resistance of the lithium-ion battery 31 may be designed smaller than internal resistance of the lead battery 32 in order to actively charge and discharge the lithium-ion battery 31.

The motor generator 16 may include a positive electrode terminal 16a. A positive electrode line 33 may be coupled to the positive electrode terminal 16a. The lithium-ion battery 31 may include a positive electrode terminal 31a. A positive electrode line 34 may be coupled to the positive electrode terminal 31a. The lead battery 32 may include a positive electrode terminal 32a. A positive electrode line 35 may be coupled to the positive electrode terminal 32a. The positive electrode lines 33 to 35 may be coupled to one another via a node 36. The lithium-ion battery 31 may include a negative electrode terminal 31b. A negative electrode line 37 may be coupled to the negative electrode terminal 31b. The lead battery 32 may include a negative electrode terminal 32b. A negative electrode line 38 may be coupled to the negative electrode terminal 32b. The motor generator 16 may include a negative electrode terminal 16b. A negative electrode line 39 may be coupled to the negative electrode terminal 16b. The negative electrode lines 37 to 39 may be each coupled to a reference potential point 40.

The positive electrode line 34 of the lithium-ion battery 31 may be provided with a switch SW1. The switch SW1 may allow for switching between an electrically conductive state and a cutoff state. Further, the positive electrode line 35 of the lead battery 32 may be provided with a switch SW2. The switch SW2 may allow for switching between the electrically conductive state and the cutoff state. The switches SW1 and SW2 may be each controlled by a battery controller 42 and a main controller 50 that are described later. The switches SW1 and SW2 may be each configured by a semiconductor element such as a metal-oxide-semiconductor field-effect transistor (MOSFET). Alternatively, the switches SW1 and SW2 may be each a mechanical switch that opens and closes a contact using electromagnetic force, for example. Note that the switches SW1 and SW2 are each also referred to as a relay and a contact, for example.

The power supply circuit 30 may include a battery module 41. The lithium-ion battery 31 and the switch SW1 may be incorporated into the battery module 41. The battery module 41 may further include the battery controller 42. The battery controller 42 may include a microcomputer, for example. The battery controller 42 may have a monitoring function and a control function. Non-limiting examples of the monitoring function may include monitoring of the state of charge SOC, a charge current and a discharge current, a terminal voltage, and a cell temperature of the lithium-ion battery 31. Non-limiting examples of the control function may include controlling the switch SW1. Further, the negative electrode line 38 of the lead battery 32 may be provided with a battery sensor 43. The battery sensor 43 may have a detection function. Non-limiting examples of the detection function may include detection of the state of charge, the charge current, the discharge current, and the terminal voltage of the lead battery 32. Moreover, a plurality of electric devices 45 may be each coupled to the positive electrode line 35 of the lead battery 32 via a positive electrode line 44. Note that the positive electrode line 35 may be provided with a fuse 46 that protects components such as the electric devices 45.

[Control System of Vehicle Control Apparatus]

Figure 3:
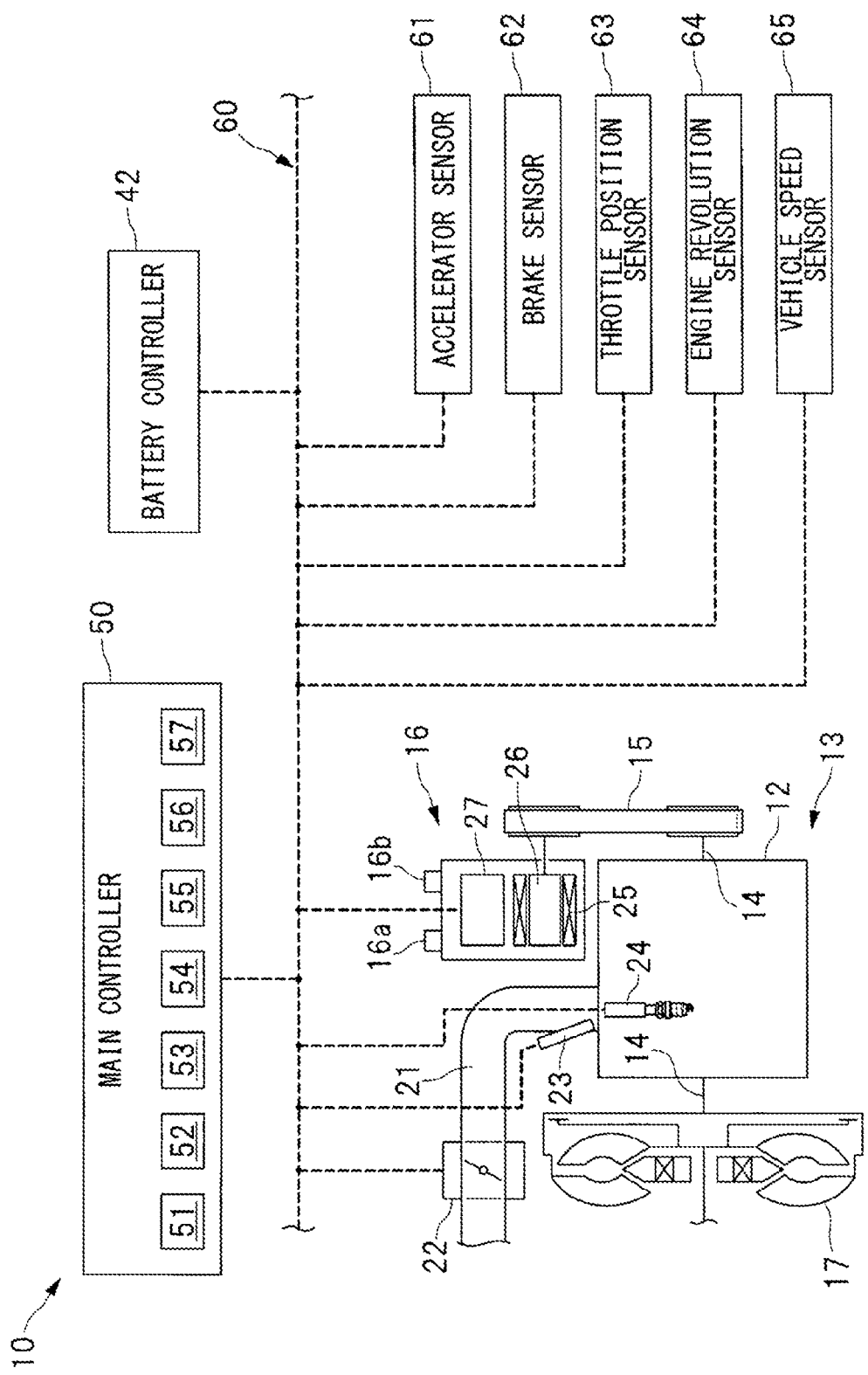
FIG. 3 schematically illustrates a control system of the vehicle control apparatus.

Description is given of a control system of the vehicle control apparatus 10. FIG. 3 schematically illustrates a control system of the vehicle control apparatus 10. As illustrated in FIGS. 1 and 3, the vehicle control apparatus 10 may include the main controller 50 in order to control components such as the engine 12 and the motor generator 16. The main controller 50 may include a microcomputer, for example. The main controller 50 may include an engine controller 51 and an ISG controller 52. The engine controller 51 may control an operation state of the engine 12. The ISG controller 52 may control an operation state of the motor generator 16 via the ISG controller 27. The main controller 50, the ISG controller 27, and the battery controller 42 may be coupled to one another to allow for mutual communication via a vehicle-mounted network 60 such as a controller area network (CAN) and a local interconnect network (LIN). The main controller 50 may perform determination on the basis of data and thereby control the operation states of components such as the engine 12 and the motor generator 16. Non-limiting examples of the data may include data transmitted from various sensors and various controllers. Non-limiting examples of the determination may include determination of a vehicle traveling situation and determination of the state of charge SOC of the lithium-ion battery 31.

Non-limiting examples of sensors coupled to the main controller 50 may include an accelerator sensor 61, a brake sensor 62, a throttle position sensor 63, an engine revolution sensor 64, and a vehicle speed sensor 65, as illustrated in FIG. 3. The accelerator sensor 61 may detect an amount of pressing down on an accelerator pedal. Hereinafter, the amount of pressing down on the accelerator pedal is referred to as an accelerator position. The brake sensor 62 may detect an amount of pressing down on a brake pedal. The throttle position sensor 63 may detect a position of the throttle valve 22. The engine revolution sensor 64 may detect engine revolution, i.e., a revolving speed of the crankshaft 14. The vehicle speed sensor 65 may detect a speed of the vehicle 1. Hereinafter, the speed of the vehicle 1 is referred to as a vehicle speed. Data indicating the operating state of the motor generator 16 may be transmitted to the main controller 50 from the ISG controller 27. Data such as data on the state of charge SOC of the lithium-ion battery 31 may be transmitted to the main controller 50 from the battery controller 42. As used herein, the state of charge SOC refers to a ratio of a storage amount of the battery to a designed capacity of the battery.

The main controller 50 may include an idling stop controller 53 in order to perform an idling stop control. In the idling stop control, the engine 12 may be automatically stopped and restarted. The idling stop controller 53 may control the engine 12 and the motor generator 16. The idling stop controller 53 may stop the engine 12 in a case where a predetermined stop condition is satisfied during driving of the engine 12. Meanwhile, the idling stop controller 53 may restart the engine 12 in a case where a predetermined start condition is satisfied during the stop of the engine 12. Non-limiting examples of the stop condition of the engine 12 may include a vehicle speed lower than a predetermined value with the brake pedal being pressed down. Non-limiting examples of the start condition of the engine 12 may include release of the brake pedal that has been pressed down and the accelerator pedal being pressed down. Note that when the engine 12 is restarted in accordance with the idling stop control, the motor generator 16 is controlled into a powered state to thereby start and revolve the engine 12.

[Electric Power Supply Situation]

Figure 4:
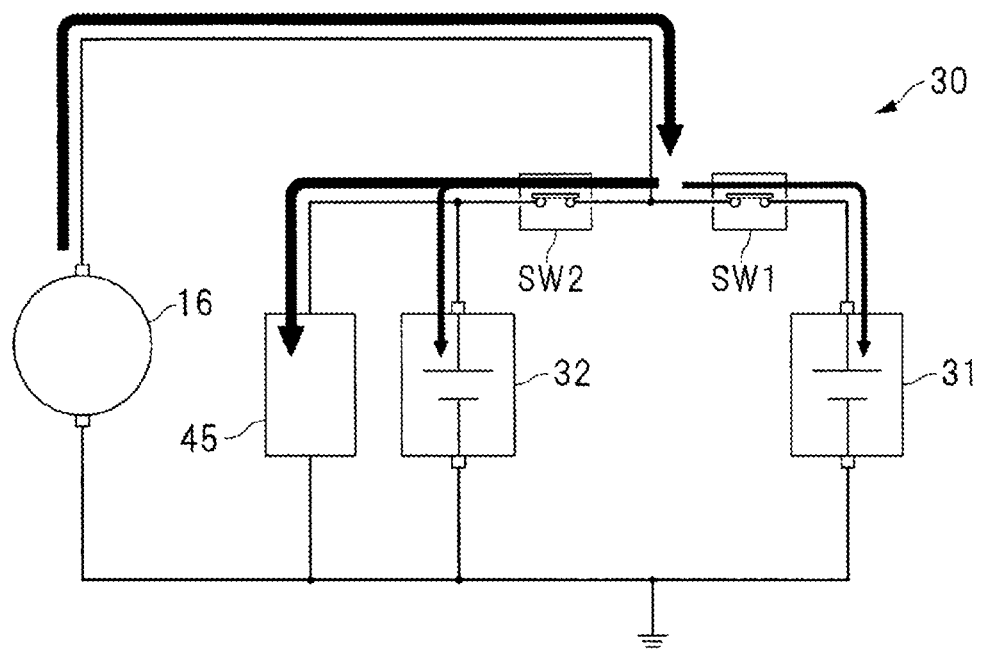
FIG. 4 describes an example of an electric power supply situation when a motor generator is controlled into a combustion power-generation state.
Figure 5:
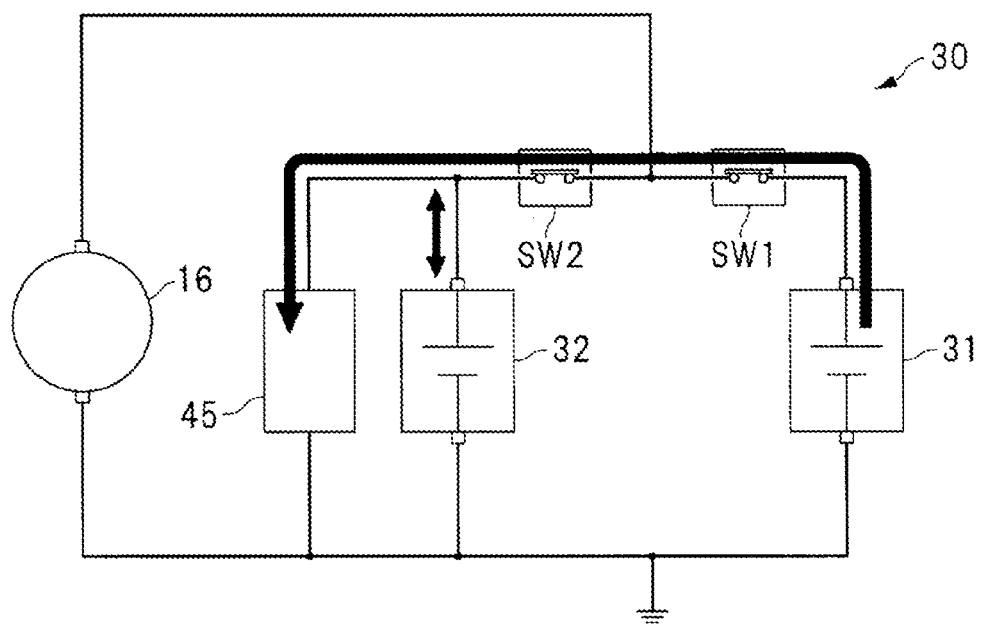
FIG. 5 describes an example of an electric power supply situation when the motor generator is controlled into a power-generation suspended state.
Figure 6:
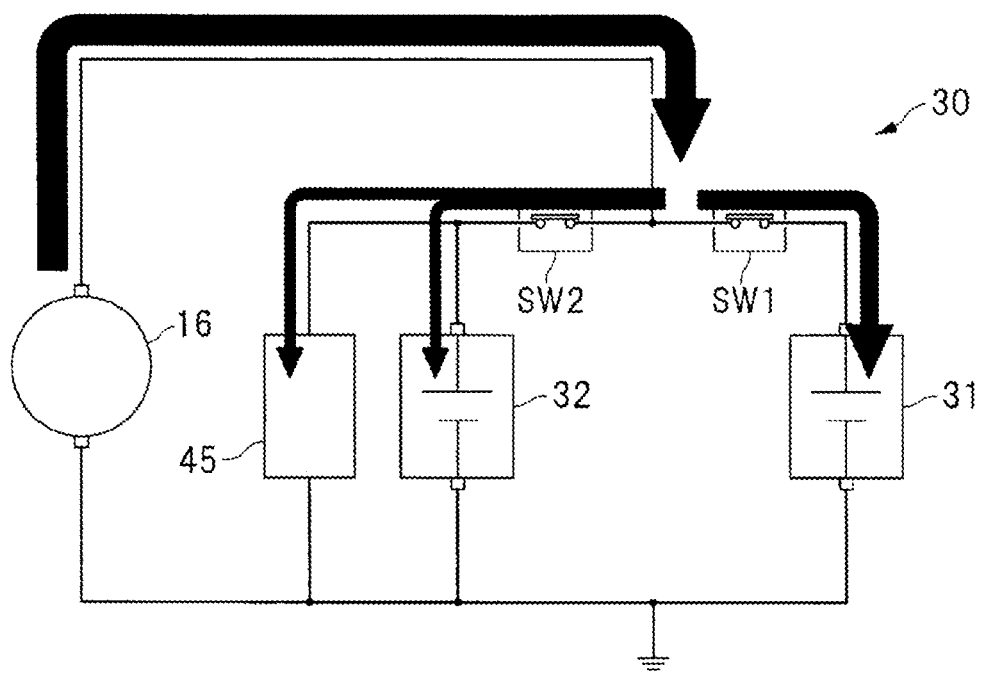
FIG. 6 describes an example of an electric power supply situation when the motor generator is controlled into a regenerative power-generation state.
Figure 7:
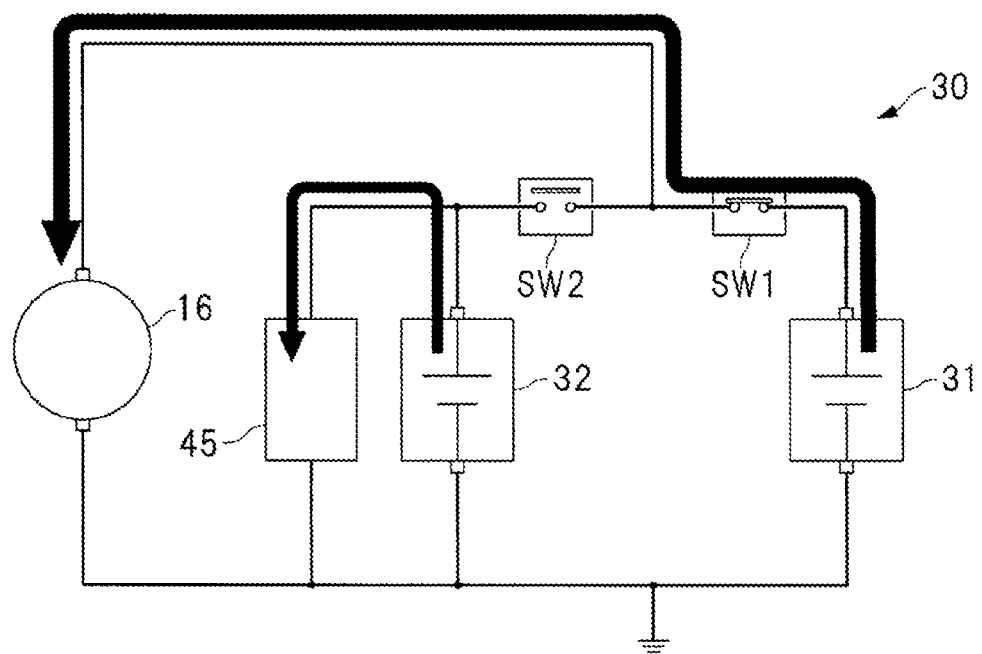
FIG. 7 describes an example of an electric power supply situation when the motor generator is controlled into a powered state.

Description is given of an electric power supply situation in association with a power-generation control and a powering control of the motor generator 16. FIG. 4 describes an example of an electric power supply situation when the motor generator 16 is controlled into a combustion power-generation state. FIG. 5 describes an example of an electric power supply situation when the motor generator 16 is controlled into a power-generation suspended state. FIG. 6 describes an example of an electric power supply situation when the motor generator 16 is controlled into a regenerative power-generation state. FIG. 7 describes an example of an electric power supply situation when the motor generator 16 is controlled into the powered state.

As illustrated in FIG. 4, in a case where the storage amount of the lithium-ion battery 31 is lowered, i.e., in a case where the state of charge SOC of the lithium-ion battery 31 is equal to or falls below a predetermined lower limit, the motor generator 16 may be controlled into the combustion power-generation state, in order to charge the lithium-ion battery 31 for enhancement of the state of charge SOC. When the motor generator 16 is controlled into the combustion power-generation state, an electric power-generation voltage of the motor generator 16 may be raised above the terminal voltage of the lithium-ion battery 31. This causes the motor generator 16 to supply generated electric power to components such as the lithium-ion battery 31, the electric device 45, and the lead battery 32, as indicated by black arrows in FIG. 4.

As illustrated in FIG. 5, in a case where the storage amount of the lithium-ion battery 31 is sufficiently secured, i.e., in a case where the state of charge SOC of the lithium-ion battery 31 exceeds the predetermined lower limit, the motor generator 16 may be controlled into the power-generation suspended state, in order to facilitate discharge of the lithium-ion battery 31 for lightening of engine load. When the motor generator 16 is controlled into the power-generation suspended state, the electric power-generation voltage of the motor generator 16 may be lowered below the terminal voltage of the lithium-ion battery 31. This causes electric power to be supplied to components such as the electric device 45 from the lithium-ion battery 31, as indicated by a black arrow in FIG. 5. Therefore, it becomes possible to suppress or stop the electric power generation of the motor generator 16, thus allowing for reduction in the engine load.

As described above, the main controller 50 may control the motor generator 16 into the state such as the combustion power-generation state and the power-generation suspended state on the basis of the state of charge SOC. Upon deceleration traveling, however, it is necessary to collect large kinetic energy for enhancement of a fuel consumption performance. Accordingly, upon the deceleration traveling, the motor generator 16 may be controlled into the regenerative power-generation state, and the electric power-generation voltage of the motor generator 16 may be largely increased. This enables the generated electric power of the motor generator 16 to be increased. Hence, it becomes possible to collect electric energy that has been actively converted from the kinetic energy, thus making it possible to enhance an energy efficiency of the vehicle 11 and thereby to improve the fuel consumption performance of the vehicle 11.

Whether to control the motor generator 16 into the regenerative power-generation state may be determined on the basis of a factor such as operation situations of the accelerator pedal and the brake pedal. In other words, coasting traveling and braking of the vehicle 11 are in a situation where the large kinetic energy is released from the vehicle 11 that is decelerating. Thus, the motor generator 16 may be brought into the regenerative power-generation state. The accelerator pedal that has been pressed down is released in the coasting traveling, whereas the brake pedal is pressed down in the braking of the vehicle 11. In contrast, acceleration traveling and constant traveling are not in a situation where the large kinetic energy is released from the vehicle 11. Thus, the motor generator 16 may be brought into the state such as the combustion power-generation state and the power-generation suspended state. The accelerator pedal is pressed down in each of the acceleration traveling and the constant traveling.

As illustrated in FIG. 6, when the motor generator 16 is controlled into the regenerative power-generation state, the electric power-generation voltage of the motor generator 16 may be increased higher than the above-described combustion power-generation state. Thus, the electric power-generation voltage to be applied to the lithium-ion battery 31 may be largely increased higher than the terminal voltage of the lithium-ion battery 31. This enables the motor generator 16 to supply a large current to the lithium-ion battery 31 and the lead battery 32, as illustrated in black arrows in FIG. 6. Thus, it becomes possible to quickly charge the lithium-ion battery 31 and the lead battery 32. Note that much of a generated current may be supplied to the lithium-ion battery 31 owing to the internal resistance of the lithium-ion battery 31 which is smaller than the internal resistance of the lead battery 32.

As illustrated in FIGS. 4 to 6, when the motor generator 16 is controlled into the combustion power-generation state, the regenerative power-generation state, or the power-generation suspended state, the switches SW1 and SW2 may be held in the electrically conductive state. In other words, in the vehicle control apparatus 10, it is possible to control the charge and discharge of the lithium-ion battery 31 only by controlling the electric power-generation voltage of the motor generator 16 without performing a switching control between the switches SW1 and SW2. This makes it possible to easily control the charge and discharge of the lithium-ion battery 31 as well as to improve durability of the switches SW1 and SW2.

As illustrated in FIG. 7, when the motor generator 16 is controlled into the powered state, the switch SW2 may be switched from the electrically conductive state to the cutoff state. In other words, in a case where the motor generator 16 starts and revolves the engine 12, or in a case where the motor generator 16 performs assist driving of the engine 12, the switch SW2 is switched from the electrically conductive state to the cutoff state. This makes it possible to prevent instantaneous voltage drop for components such as the electric device 45 even in a case where a large current is supplied to the motor generator 16 from the lithium-ion battery 31. This enables the components such as the electric device 45 to function properly.

[Engine Mode and Assist Mode]

Description is given next of an engine mode and an assist mode. The illustrated vehicle 11 has, as traveling modes, an engine mode and an assist mode that are selectable. The engine mode allows for transfer of drive force of the engine 12 to the wheels 20. The assist mode allows for transfer of drive force of each of the engine 12 and the motor generator 16 to the wheels 20. In other words, in a case of performing the engine mode, the motor generator 16 may be controlled into one of the combustion power-generation state, the regenerative power-generation state, and the power-generation suspended state that are described above. In contrast, in a case of performing the assist mode, the motor generator 16 may be controlled into the above-described powered state. In both of the engine mode and the assist mode, the engine 12 is controlled into a driven state.

Figure 8:
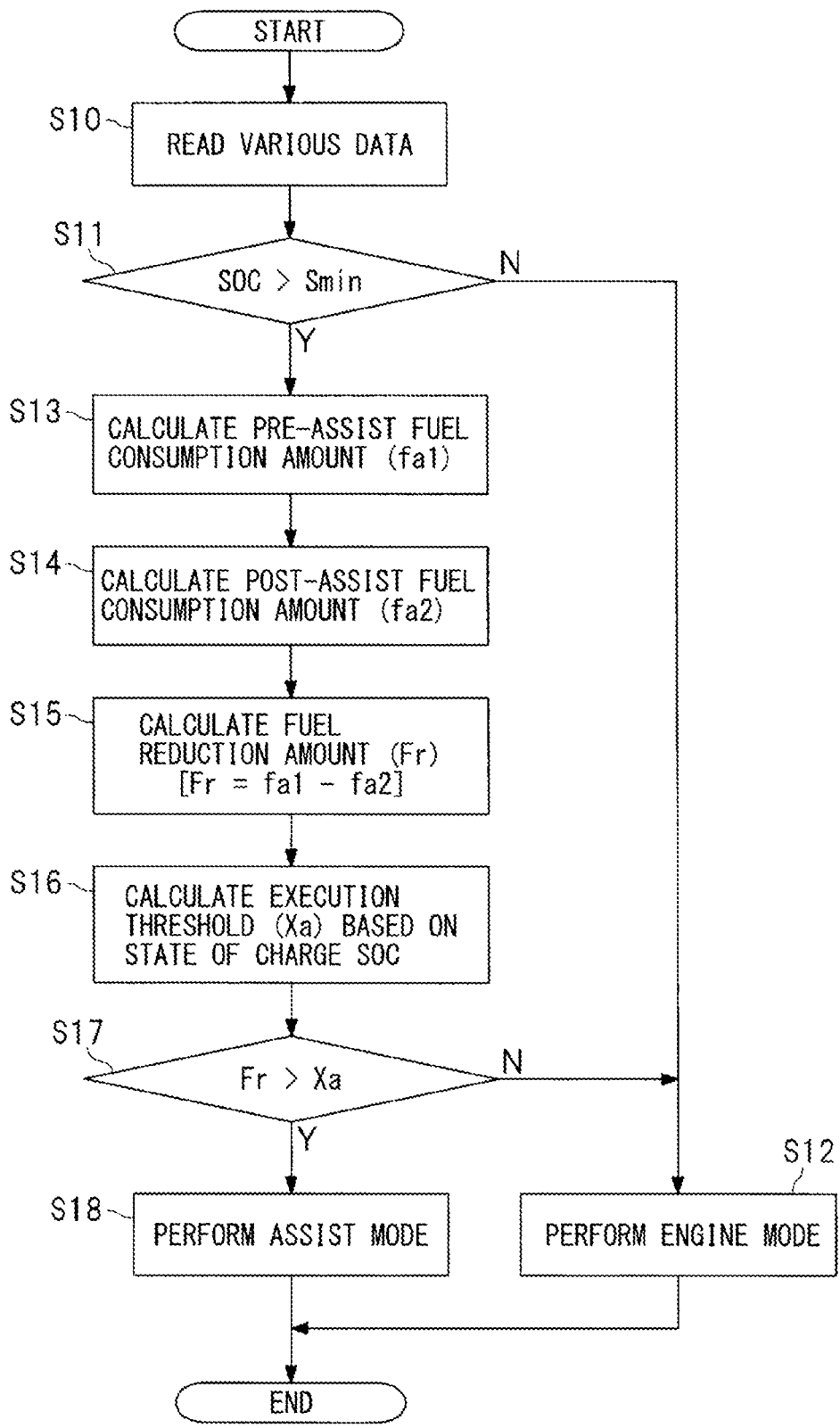
FIG. 8 is a flowchart illustrating an example of a procedure for performing an engine mode and an assist mode.

FIG. 8 is a flowchart illustrating an example of a procedure of performing the engine mode and the assist mode. Steps in the flowchart illustrated in FIG. 8 may be performed by the main controller 50 at every predetermined cycle. As illustrated in FIG. 3, the main controller 50 includes functional units such as a consumption amount calculator 54, a reduction amount calculator 55, a threshold setter 56, and a mode controller 57, in order to perform the engine mode and the assist mode along the flowchart.

As illustrated in FIG. 8, in step S10, the main controller 50 may read data transmitted from the various sensors and various controllers. Non-limiting examples of the data to be read by the main controller 50 may include the state of charge SOC, a fuel consumption rate FC, engine revolution Ne, an accelerator position, and a vehicle speed. As used herein, the fuel consumption rate FC refers to a fuel consumption rate of the engine 12. The fuel consumption rate FC is determined by a factor such as the engine revolution and engine torque. The fuel consumption rate FC is also referred to as brake specific fuel consumption (BSFC).

In step S11, determination may be made as to whether the state of charge SOC of the lithium-ion battery 31 exceeds a predetermined lower limit Smin. In a case where, in step S11, determination is made that the state of charge SOC of the lithium-ion battery 31 is equal to or falls below the lower limit Smin (step S11: N), the storage amount of the lithium-ion battery 31 is lowered, and accordingly it is difficult to supply sufficient electric power to the motor generator 16. The flow may thus proceed to step S12, in which the engine mode may be performed. In the engine mode, the motor generator 16 may be controlled into the state such as the combustion power-generation state.

On the other hand, in a case where, in step S11, determination is made that the state of charge SOC exceeds the lower limit Smin (step S11: Y), the flow may proceed to step S13. In step S13, the consumption amount calculator 54 may calculate a pre-assist fuel consumption amount fa1 on the basis of the following Expression (1).

$$fa1\ [g/s] = FC\ [g/kWh] \times Te\ [Nm] \times Ne\ [rpm] \times 2\pi/60/1000/60/60 \qquad (1)$$

In one implementation, the pre-assist fuel consumption amount fa1 may serve as a "first fuel consumption amount". As used herein, the pre-assist fuel consumption amount fa1 refers to an estimated value of the fuel consumption amount per unit time consumed when the engine mode is performed. As used herein, engine torque Te indicated in Expression (1) and later-described Expression (2) refers to output torque that is required by the engine 12. The engine torque Te is calculated on the basis of a factor such as the vehicle speed and the accelerator position.

In step S14, the consumption amount calculator 54 may calculate a post-assist fuel consumption amount fa2 on the basis of the following Expression (2).

$$fa2\ [g/s] = FC\ [g/kWh] \times (Te-Tm)\ [Nm] \times Ne\ [rpm] \times 2\pi/60/1000/60/60 \qquad (2)$$

In one implementation, the post-assist fuel consumption amount fa2 may serve as a "second fuel consumption amount". As used herein, the post-assist fuel consumption amount fa2 refers to an estimated value of the fuel consumption amount per unit time consumed when the assist mode is performed. As used herein, motor torque Tm indicated in Expression (2) refers to output torque that is required by the motor generator 16 when the assist mode is performed. As the motor torque Tm, a predetermined torque value set in advance may be used. Alternatively, the motor torque Tm may be calculated on the basis of a factor such as the vehicle speed and the accelerator position. When the post-assist fuel consumption amount fa2 is calculated, the motor torque Tm is subtracted from the engine torque Te as illustrated in Expression (2). As a result, the post-assist fuel consumption amount fa2 is calculated to be smaller than the above-described pre-assist fuel consumption amount fa1.

In step S15, the reduction amount calculator 55 may calculate fuel reduction amount Fr on the basis of the following Expression (3).

$$\text{Fr [g/s]} = fa1 - fa2 \quad (3)$$

As used herein, the fuel reduction amount Fr refers to a value obtained as a result of subtraction of the post-assist fuel consumption amount fa2 from the pre-assist fuel consumption amount fa1. In other words, the fuel reduction amount Fr refers to an amount of fuel per unit time, which is able to be reduced by performing the assist mode instead of the engine mode.

In step S16, the threshold setter 56 may set an execution threshold Xa on the basis of the state of charge SOC. In one implementation, the execution threshold Xa may serve as a "threshold". Thereafter, in step S17, the mode controller 57 may determine whether the fuel reduction amount Fr exceeds the execution threshold Xa. When determination is made, in step S17, that the fuel reduction amount Fr exceeds the execution threshold Xa (step S17: Y), the fuel reduction amount in the case of performing the assist mode is large. Thus, the assist mode is performed with use of the electric power of the lithium-ion battery 31 (step S18). On the other hand, when determination is made, in step S17, that the fuel reduction amount Fr is equal to or falls below the execution threshold Xa (step S17: N), the fuel reduction amount in the case of performing the assist mode is small. Thus, the engine mode is performed instead of the assist mode (step S12).

[Execution Threshold Xa]

Figure 9:
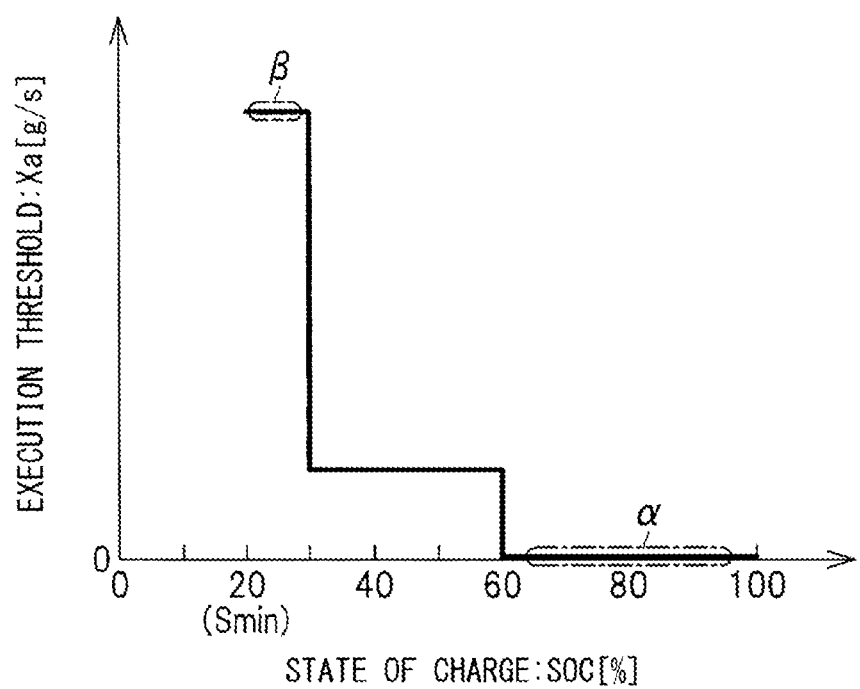
FIG. 9 describes a relationship between an execution threshold and a state of charge.

FIG. 9 describes a relationship between the execution threshold Xa and the state of charge SOC. As illustrated in FIG. 9, in a case where the state of charge SOC is high, the execution threshold Xa is set low. Meanwhile, in a case where the state of charge SOC is low, the execution threshold Xa is set high. In this manner, by increasing and decreasing the execution threshold Xa on the basis of the state of charge SOC, it becomes possible to perform the assist mode properly in accordance with a fuel reduction effect.

In a case where the state of charge SOC of the lithium-ion battery 31 is high, i.e., in a case where the lithium-ion battery 31 is sufficiently charged, frequency of performing the assist mode may be raised by lowering the execution threshold Xa as indicated by a symbol $\alpha$. In other words, in a case where the state of charge SOC of the lithium-ion battery 31 is high, it is possible to actively use the electric power of the lithium-ion battery 31. Thus, the execution threshold Xa may be lowered to raise the frequency of performing the assist mode. This makes it possible to reduce fuel consumption by actively performing the assist mode even in a traveling situation with a less fuel reduction effect. Hence, it becomes possible to improve the fuel consumption performance of the vehicle 11.

On the other hand, in a case where the state of charge SOC of the lithium-ion battery 31 is low, i.e., in a case where the storage amount of the lithium-ion battery 31 is low, the frequency of performing the assist mode may be lowered by raising the execution threshold Xa as indicated by a symbol $\beta$. In other words, in a case where the state of charge SOC of the lithium-ion battery 31 is low, the execution threshold Xa may be raised to lower the frequency of performing the assist mode, in order to prevent useless consumption of the electric power of the lithium-ion battery 31. This makes it possible to limit the execution of the assist mode only to a traveling state with a larger fuel reduction effect. Thus, it becomes possible to avoid electric power depletion of the lithium-ion battery 31 while reducing the fuel consumption using the assist mode.

Figure 10:
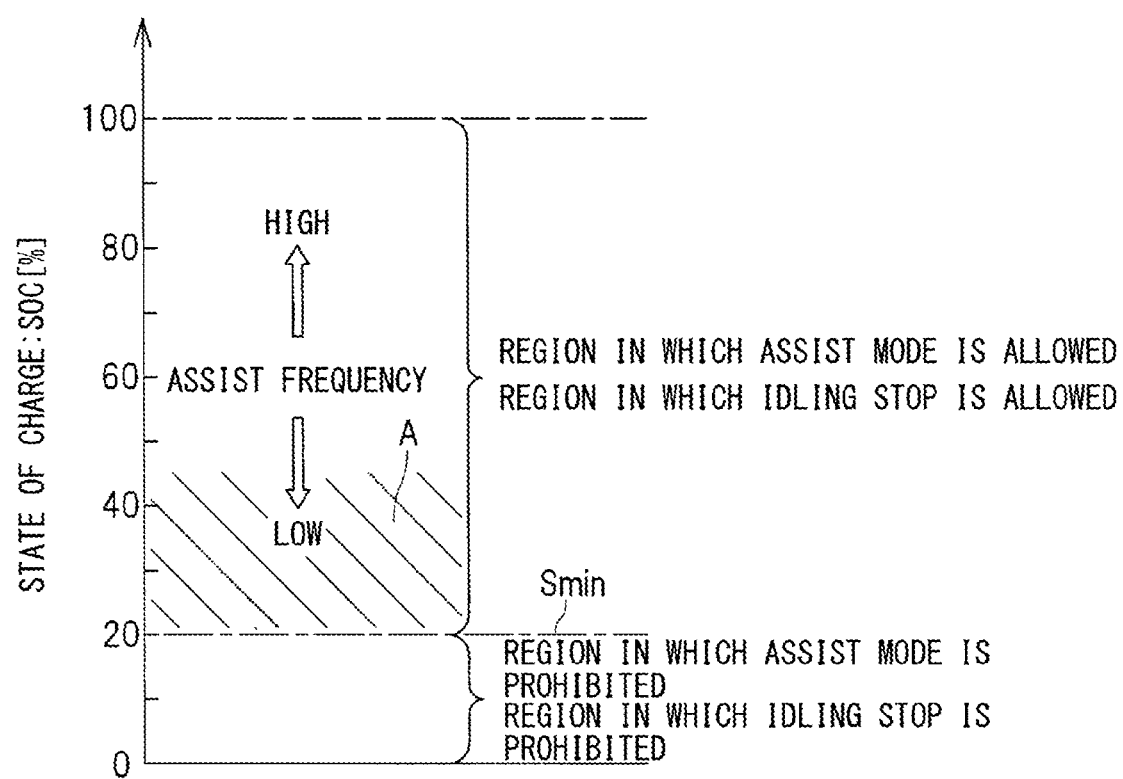
FIG. 10 describes a region in which the assist mode and an idling stop are performed.

FIG. 10 describes a region in which the assist mode and the idling stop are performed. As illustrated in FIG. 10, in a region in which the state of charge SOC of the lithium-ion battery 31 is equal to or falls below the lower limit Smin, it is difficult to supply electric power to the motor generator 16 from the lithium-ion battery 31. Accordingly, the execution of the assist mode and the idling stop control is prohibited. In contrast, in a region in which the state of charge SOC of the lithium-ion battery 31 exceeds the lower limit Smin, the execution of the assist mode and the idling stop control is allowed. In the region in which the execution of the assist mode is allowed, the execution threshold Xa may be raised as the state of charge SOC comes closer to the lower limit Smin, thereby allowing the frequency of performing the assist mode to be set lower. Hereinafter, the frequency of performing the assist mode is referred to as assist frequency.

To be more specific, in a region A having the lower state of charge SOC, the assist frequency is low and thus lowering of the state of charge SOC is suppressed, as illustrated in FIG. 10. This makes it possible to keep the state of charge SOC at a region higher than the lower limit Smin. In other words, it is possible to avoid excessive lowering of the state of charge SOC that is equal to or falls below the lower limit Smin. This enables the lithium-ion battery 31 to secure electric power for restarting of the engine 12. Thus, when there comes an opportunity to perform the idling stop control, it is possible to stop the engine 12 without losing the opportunity. That is, it is possible to avoid limitation on the idling stop control due to electric power shortage. From this point of view as well, it is possible to improve the fuel consumption performance through fuel consumption reduction.

Figure 11:
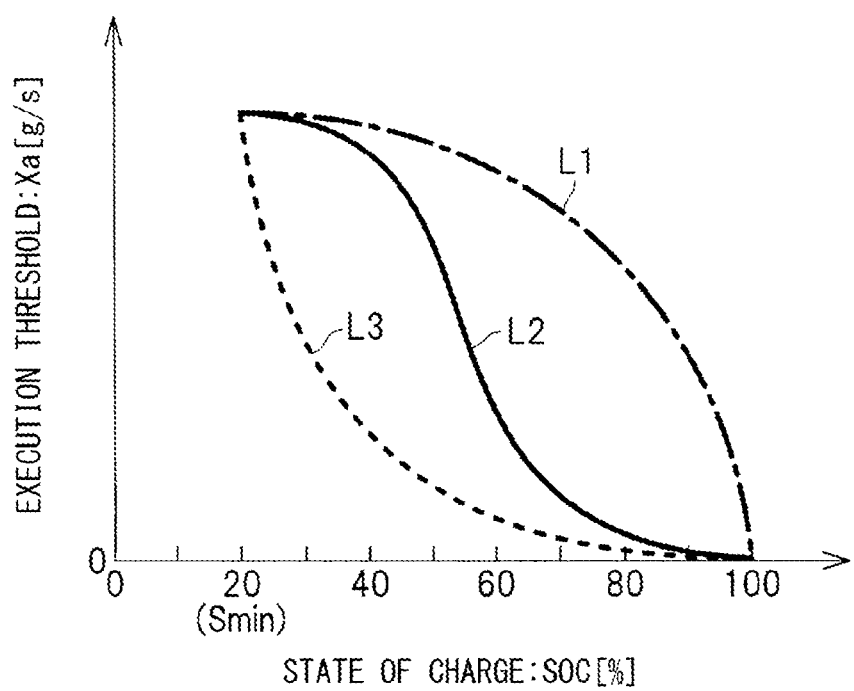
FIG. 11 describes another example of the relationship between the execution threshold and the state of charge.

In one example illustrated in FIG. 9, the execution threshold Xa is varied stepwise in accordance with the state of charge SOC; however, this is not limitative. The execution threshold Xa may also be varied continuously in accordance with the state of charge SOC. FIG. 11 describes another example of the relationship between the execution threshold Xa and the state of charge SOC. As illustrated by symbols L1, L2, and L3 in FIG. 11, the execution threshold Xa may also be varied continuously in accordance with the state of charge SOC. Even in this case, it is possible to obtain effects similar to the above-described effects, by setting the execution threshold Xa low when the state of charge SOC is high, while setting the execution threshold Xa high when the state of charge SOC is low.

The technology is by no means limited to the foregoing implementation, and various changes and modifications may be made without departing from the scope of the technology. In the above description, the motor generator 16 to be coupled to the crankshaft 14 is adopted as the electric motor; however, this is not limitative. Any other electric motor may be adopted insofar as the electric motor is able to transfer drive force to the wheels 20. Further, in examples illustrated in FIGS. 9 to 11, a value of 20% is adopted as the lower limit Smin of the state of charge SOC. However, this is not limitative; any other value may be adopted. Furthermore, in the above description, the units such as the idling stop controller 53, the consumption amount calculator 54, the reduction amount calculator 55, the threshold setter 56, and the mode controller 57 are incorporated into the main controller 50. However, a part or all of one or more of the units such as the idling stop controller 53, the consumption amount calculator 54, the reduction amount calculator 55, the threshold setter 56, and the mode controller 57 may be incorporated into any other controller.

In the above description, the lithium-ion battery 31 and the lead battery 32 are coupled to the motor generator 16; however, this is not limitative. Only the lithium-ion battery 31 may be coupled to the motor generator 16. Further, in the above description, the lithium-ion battery 31 is adopted as the electricity storage device; however, this is not limitative. Any other type of battery or capacitor may be adopted. In an illustrated example, the switch SW1 is provided on the positive electrode line 34 of the lithium-ion battery 31; however, this is not limitative. For example, as indicated by an alternate long and short dashed line in FIG. 2, the switch SW1 may also be provided on the negative electrode line 37 of the lithium-ion battery 31.

According to one implementation of the technology, the threshold that allows the assist mode to be performed is set low in a case where the electricity storage device has high state of charge, whereas the threshold that allows the assist mode to be performed is set high in a case where the electricity storage device has low state of charge. This makes it possible to perform the assist mode that assists the engine by the electric motor, while avoiding excessive lowering of the state of charge.

The main controller 50 illustrated in FIGS. 1 and 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable tangible medium, to perform all or a part of functions of the main controller 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the main controller 50 illustrated in FIGS. 1 and 3.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle control apparatus configured to cause a vehicle to selectively perform an engine mode and an assist mode, the vehicle being provided with an engine, an electric motor, a wheel being provided to receive a drive force of the engine and a drive force of the electric motor, and an electricity storage device coupled to the electric motor, the engine mode allowing for transfer of the drive force of the engine to the wheel, the assist mode allowing for transfer of both of the drive force of the engine and the drive force of the electric motor to the wheel, the vehicle control apparatus comprising:
a consumption amount calculator configured to calculate a first fuel consumption amount and a second fuel consumption amount, the first fuel consumption amount being an amount of fuel consumption when the engine mode is performed, the second fuel consumption amount being an amount of fuel consumption when the assist mode is performed;
a reduction amount calculator configured to calculate a possible fuel reduction amount by subtracting the second fuel consumption amount from the first fuel consumption amount, the possible fuel reduction amount being an amount of fuel reduction being possibly reduced in a case where the assist mode is performed as compared with a case where the engine mode is performed;
a mode controller configured to cause the assist mode to be performed when the possible fuel reduction amount exceeds a threshold, and cause the engine mode to be performed when the possible fuel reduction amount is equal to or falls below the threshold; and
a threshold setter configured to set the threshold to a first value when a state of charge of the electricity storage device is in a first charging level, and set the threshold to a second value when the state of charge of the electricity storage device is in a second charging level, the second value being higher than the first value, the second charging level being lower than the first charging level.

2. The vehicle control apparatus according to claim 1, further comprising an idling stop controller configured to perform an idling stop control, the idling stop control causing the engine to be stopped when a stop condition is satisfied, and causing the engine to be started using the electric motor when a start condition is satisfied.

3. The vehicle control apparatus according to claim 2, wherein
the assist mode and the idling stop control are each prohibited from being performed when the state of charge of the electricity storage device is equal to or falls below a limit, and
the assist mode and the idling stop control are each allowed to be performed when the state of charge of the electricity storage device exceeds the limit.

4. A vehicle control apparatus configured to cause a vehicle to selectively perform an engine mode and an assist mode, the vehicle being provided with an engine, an electric motor, a wheel being provided to receive a drive force of the engine and a drive force of the electric motor, and an electricity storage device coupled to the electric motor, the engine mode allowing for transfer of the drive force of the engine to the wheel, the assist mode allowing for transfer of both of the drive force of the engine and the drive force of the electric motor to the wheel, the vehicle control apparatus comprising
circuitry configured to
calculate a first fuel consumption amount and a second fuel consumption amount, the first fuel consumption amount being an amount of fuel consumption when the engine mode is performed, the second fuel consumption amount being an amount of fuel consumption when the assist mode is performed,
calculate a possible fuel reduction amount by subtracting the second fuel consumption amount from the first fuel consumption amount, the possible fuel reduction amount being an amount of fuel reduction being possibly reduced in a case where the assist mode is performed as compared with a case where the engine mode is performed, cause the assist mode to be performed when the possible fuel reduction amount exceeds a threshold, cause the engine mode to be performed when the possible fuel reduction amount is equal to or falls below the threshold, set the threshold to a first value when a state of charge of the electricity storage device is in a first charging level, and set the threshold to a second value when the state of charge of the electricity storage device is in a second charging level, the second value being higher than the first value, the second charging level being lower than the first charging level.

\* \* \* \* \*